(12) United States Patent
Shin

(10) Patent No.: US 8,285,339 B2
(45) Date of Patent: Oct. 9, 2012

(54) MOBILE COMMUNICATION TERMINAL AND METHOD FOR PERFORMING AUTOMATIC INCOMING CALL NOTIFICATION MODE CHANGE

(75) Inventor: Ho Yong Shin, Seoul (KR)

(73) Assignee: Samsung Electronics Co., Ltd (KR)

( * ) Notice: Subject to any disclaimer, the term of this patent is extended or adjusted under 35 U.S.C. 154(b) by 1044 days.

(21) Appl. No.: 11/705,803

(22) Filed: Feb. 13, 2007

(65) Prior Publication Data

US 2008/0070640 A1    Mar. 20, 2008

(30) Foreign Application Priority Data

Sep. 15, 2006    (KR) .................. 10-2006-0089745

(51) Int. Cl.
*H04M 1/00* (2006.01)
(52) U.S. Cl. ............... 455/567; 455/550.1; 379/418
(58) Field of Classification Search ............ 455/557, 455/567, 566; 379/373.01, 418
See application file for complete search history.

(56) References Cited

U.S. PATENT DOCUMENTS

| 7,089,041 B2 * | 8/2006 | Huang ........................... 455/567 |
| 7,167,680 B2 * | 1/2007 | Haller et al. .................. 455/41.3 |
| 7,392,066 B2 * | 6/2008 | Haparnas ....................... 455/567 |
| 7,469,155 B2 * | 12/2008 | Chu ................................ 455/567 |
| 2003/0008687 A1 * | 1/2003 | Nishimura .................... 455/567 |
| 2003/0013495 A1 * | 1/2003 | Oleksy .......................... 455/567 |
| 2005/0181838 A1 * | 8/2005 | Matsuda et al. .............. 455/567 |
| 2006/0153358 A1 * | 7/2006 | Zernovizky et al. ..... 379/392.01 |
| 2007/0032252 A1 * | 2/2007 | Yang ............................. 455/466 |
| 2008/0119221 A1 * | 5/2008 | Wong et al. ................. 455/550.1 |
| 2008/0170683 A1 * | 7/2008 | Zernovizky et al. .......... 379/418 |
| 2009/0124296 A1 * | 5/2009 | Tanae ............................ 455/567 |

* cited by examiner

*Primary Examiner* — Kamran Afshar
*Assistant Examiner* — Khawar Iqbal
(74) *Attorney, Agent, or Firm* — The Farrell Law Firm, P.C.

(57) ABSTRACT

A mobile communication terminal is disclosed that allows an incoming call notification mode to be automatically changed depending on an ambient noise signal level, thus eliminating the need to manually change the incoming call notification mode. A microphone capable of automatically changing an incoming call notification mode according to a noise signal level is provided and the terminal stores at least one reference noise signal level; drives the microphone according to a set automatic incoming call notification changing mode to measure a perceived noise signal value; compares the measured noise signal value with the stores reference noise signal level; and sets an incoming call notification mode of the mobile communication terminal to one of a bell mode and a vibration mode according to the result.

18 Claims, 3 Drawing Sheets

| REFERENCE NOISE SIGNAL LEVEL (21) | UPPER REFERENCE NOISE SIGNAL VALUE (db) (23) |
|---|---|
| 1 | 50 |
| 2 | 60 |
| 3 | 70 |
| 4 | 80 |
| 5 | 90 |

MOBILE COMMUNICATION TERMINAL AND METHOD FOR PERFORMING AUTOMATIC INCOMING CALL NOTIFICATION MODE CHANGE

PRIORITY

This application claims priority to an application entitled "MOBILE COMMUNICATION TERMINAL AND METHOD FOR PERFORMING AUTOMATIC INCOMING CALL NOTIFICATION MODE CHANGE" filed in the Korean Intellectual Property Office on Sep. 15, 2006 and assigned Serial No. 2006-89745, the contents of which are incorporated herein by reference.

BACKGROUND OF THE INVENTION

1. Field of the Invention

The present invention relates to a mobile communication terminal having a microphone, and, more particularly, to a mobile communication terminal and method for performing an automatic incoming call notification mode change.

2. Description of the Related Art

Examples of a mobile communication terminal include a Personal Digital Assistant (PDA), a cellular phone, a Personal Communication Service (PCS) phone, and other mobile devices having communication capabilities.

With increasing dissemination of mobile communication terminals, a majority of users tend to carry mobile communication terminals with them all the time. However, as the popularity of mobile communication terminals soars, there is growing social concern about adverse effects from their use. Bells ringing on a mobile communication terminal when there is an incoming call increases noise pollution, and is particularly bothersome at important meetings, movie theaters, rallies, and other places where many people gather together and should be silent.

For example, receiving an incoming call at a library when an incoming call notification mode of a mobile communication terminal is set to a bell mode, noisy bell sound irritates people inside the library.

Conversely, if an incoming call notification mode is set to a bell mode at a noisy place such as that where a rock concert is held, a user may not realize that an urgent phone call is incoming due to ambient noise.

A conventional approach to solving the above problems is to prohibit the use of a mobile communication terminal using a radio wave blocking device for blocking radio waves from a mobile communication system in a specific area. However, the conventional approach can be applied only to an extremely limited environment, partly due to the high cost of installing the radio wave blocking device.

When the radio wave blocking device is not installed, a subscriber should set the appropriate mode each time ambient conditions change.

Another drawback of the conventional approach is that an urgent call cannot be received due to prohibition of the use of a mobile communication terminal, thus causing user inconvenience.

Therefore, there is an urgent need to develop a mobile communication terminal and method for automatically changing an incoming call notification mode depending on the place where the mobile communication terminal is used.

SUMMARY OF THE INVENTION

In order to solve the above problems, an object of the present invention is to provide a mobile communication terminal for automatically changing an incoming call notification mode according to a noise signal level.

In order to achieve the above object, according to the present invention, there is provided a mobile communication terminal having a microphone that is capable of performing an automatic incoming call notification mode change, including: a storage unit for storing at least one reference noise signal level; an audio processor for driving the microphone according to the automatic incoming call notification changing mode to measure a perceived noise signal value; a noise signal level comparator for comparing the measured noise signal value with the reference noise signal levels stored in the storage unit and outputting the comparison result; and a controller for setting an incoming call notification mode of the mobile communication terminal to one of a bell mode and a vibration mode according to the result.

In accordance with another embodiment of the present invention, there is provided a method of performing an automatic incoming call notification mode change of a mobile communication terminal having a microphone, including measuring, if an incoming call notification mode is set to the automatic incoming call notification changing mode, the noise signal value input by driving the microphone; setting the incoming call notification mode to a bell or vibration mode according to the measured noise signal value.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Hereinafter, preferred embodiments of the present invention are described in detail with reference to the accompanying drawings. The same reference symbols are used throughout the drawings to identify the same or corresponding elements. Detailed descriptions of constructions or processes known in the art are omitted to avoid obscuring the subject matter of the present invention.

Figures 1, 2:
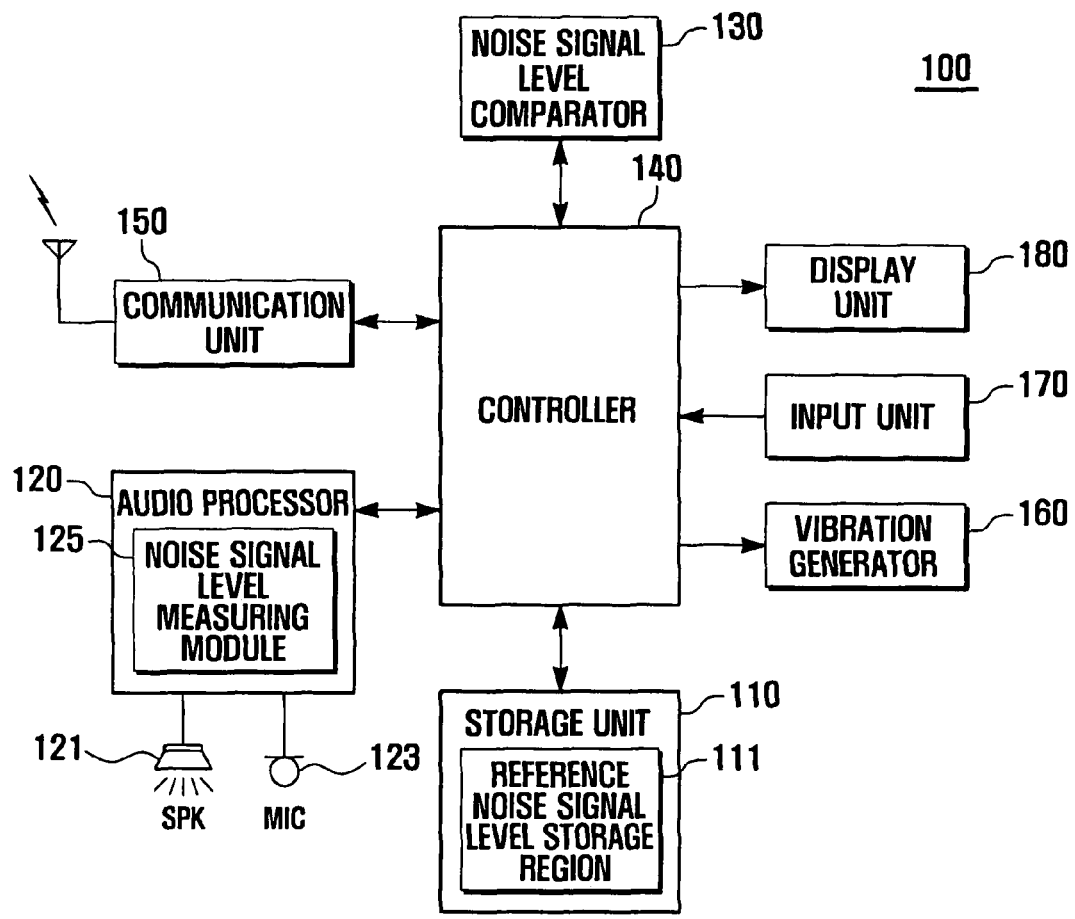
FIG. 1 is a block diagram illustrating a configuration of a mobile communication terminal according to the present invention.
FIG. 2 is a table illustrating reference noise signal levels corresponding to upper reference noise signal values according to the present invention.

FIG. 1 is a block diagram illustrating a configuration of a mobile communication terminal 100 according to the present invention. FIG. 2 is a table illustrating reference noise signal levels corresponding to upper reference noise signal values according to the present invention.

Referring to FIG. 1, the mobile communication terminal 100 includes a storage unit 110, audio processor 120, noise signal level comparator 130, controller 140, communication unit 150, vibration generator 160, input unit 170, and display unit 180.

The storage unit 110 stores programs and data necessary for the controller 140 to control the operation and the status of the mobile communication terminal 100. The storage unit 110 preferably includes an Erasable Programmable Read Only Memory (EPROM), a Static Random Access Memory (SRAM), a flash memory, or other types of memory. In particular, the storage unit 110 stores one or more reference noise signal levels. The reference noise signal level preferably has an upper and lower reference noise signal value. The lower reference noise signal value is between 30 and 40 dB. The upper reference noise signal value may be equal to a bell sound signal value set by a user.

Referring to FIG. 2, the storage unit 110 also stores upper reference noise signal values 23 corresponding to reference noise signal levels 21. For example, if the upper reference noise signal value 23 is '50 dB', the reference noise signal level 21 is set to '1'. If the upper reference noise signal value 23 is '90 dB', the reference noise signal level 21 is set to '5'.

The audio processor 120 converts a user's voice signal into a form that is suitable for transmission through the communication unit 150 and transforms a called party's voice signal input through the communication unit 150 or various audio signals generated by the controller 140 into a signal that can be output through a speaker SPK 121. In particular, the audio processor 120 receives an analog noise signal through a microphone MIC 123 to convert the analog noise signal into a digital signal.

The audio processor 120 also measures the noise signal value. For example, the audio processor 120 may determine the noise signal value input through the microphone MIC 123 as 30 dB.

The noise signal level comparator 130 compares the noise signal value measured by the audio processor 120 with a reference noise signal level stored in the storage unit 110. For example, if the noise signal value measured by the audio processor 120 is 50 dB and the lower reference noise signal value stored in the storage unit 110 is 40 dB, respectively, the noise signal level comparator 130 determines that the former is greater than the latter and outputs the comparison result to the controller 140.

The controller 140 controls the overall state and operation of the mobile communication terminal 100. The controller 140 may be a microprocessor or Digital Signal Processor (DSP). In particular, the controller 140 sets an incoming call notification mode of the mobile communication terminal 100 to a bell mode or to a vibration mode based on a signal output from the noise signal level comparator 130. More specifically, if the controller 140 determines that the measured noise signal value falls within a first noise region based on the result output from the noise signal level comparator 130, the controller 140 sets the incoming call notification mode of the mobile communication terminal 100 to a vibration mode. The measured noise signal value falls within the first noise region when the measured noise signal value is either less than a lower reference noise signal value or greater than an upper reference noise signal value.

For example, the lower reference noise signal value may be between 30 and 40 dB, which is a range typically measured in a library. The lower reference noise signal value may be preset during manufacture of the mobile communication terminal 100 or set based on a user's selection information. The upper reference noise signal value may be a bell sound signal value set by the user, as described above with reference to FIG. 2.

Conversely, if the measured noise signal value does not fall within the first noise region, the controller 140 determines that the noise signal value belongs to a second noise region different from the first noise region. The controller 140 then sets the incoming call notification mode to a bell mode. More specifically, the noise signal value belongs to the second noise region when the noise signal value is both greater than the lower reference noise signal value and less than the upper reference noise signal value.

In particular, the controller 140 drives the microphone MIC 123 of the audio processor 120 at time intervals of a predetermined duration. Preferably, the duration is five seconds.

Upon receipt of an incoming call signal from the communication unit 150, the controller 140 drives the microphone MIC 123 of the audio processor 120 so that an analog noise signal from the surrounding environment is input through the microphone MIC 123.

Upon receipt of the incoming call signal from the communication unit 150, the controller 140 then processes an incoming call according to the set incoming call notification mode.

The communication unit 150 is connected to the controller 140 and converts audio and control data into a radio signal for transmission and receives a radio signal to convert it into audio and control data. In particular, the communication unit 150 transmits and receives a radio signal for connecting a call to and from a base station. In this case, the radio signal is an incoming or outgoing call signal.

The vibration generator 160 is typically driven by a motor to vibrate the terminal 100. In particular, when the incoming call notification mode of the mobile communication terminal 100 is set to a vibration mode, the motor drives the vibration generator 160 to generate vibrate the terminal 100.

The input unit 170 may be a keypad, touch screen, or other device and acts as a user interface to output a signal input by the user to the controller 140. That is, the input unit 170 outputs a control signal according to the user's selection information to apply the control signal to the controller 140 so that the controller 140 performs the appropriate operation. In particular, the input unit 170 sets the incoming call notification mode of the mobile communication terminal 100 according to the user's selection.

The display unit 180 displays the status and operation process of the mobile communication terminal 100. Further, the controller 140 controls the display unit 180 to receive display data corresponding to data received from the input unit 170 to display the display data or to display icons and characters representing the operation state of the mobile communication terminal 100 and other various information. The controller 140 also controls the display unit 180 to visually indicate an appropriate state when the user either sets a necessary function or performs another function.

Figure 3:
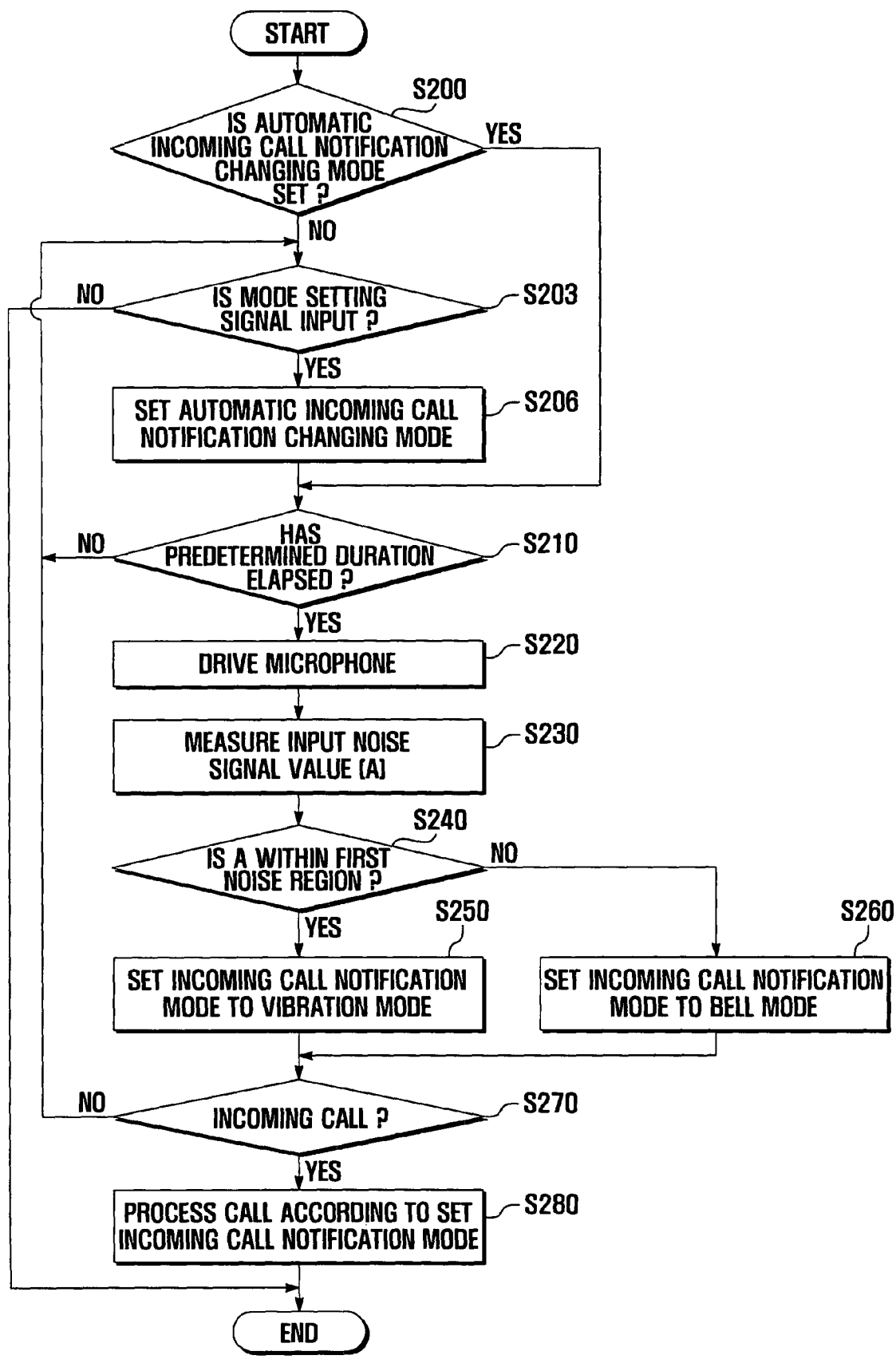
FIG. 3 is a flowchart illustrating a method of performing an automatic incoming call notification mode change according to present invention.

FIG. 3 is a flowchart illustrating a method of performing an automatic incoming call notification mode change according to the present invention. Referring to FIGS. 1 and 3, the controller 140 checks whether an incoming call notification mode of the mobile communication terminal 100 is set to an automatic incoming call notification changing mode in Step 200. If an incoming call notification mode is not set to an automatic incoming call notification changing mode, the controller 140 checks whether a signal for setting an automatic incoming call notification changing mode has been input in Step 203. If such a signal has been input, the controller 140 sets the incoming call notification mode to an automatic incoming call notification changing mode in Step 206. If such a signal has not been input, the controller 140 performs an appropriate function. That is, the controller 140 performs an incoming call notification mode set by a user.

If the incoming call notification mode of the mobile communication terminal 100 is set to an automatic incoming call notification changing mode, the controller 140 checks whether a predetermined time duration has elapsed in Step 210. If a predetermined time duration has elapsed, in Step 210 the controller 140 drives the microphone MIC 123 of the audio processor 120 in Step 220, and measures the noise signal value input through the microphone MIC 123 in Step 230. If a predetermined time duration has not elapsed at Step 210, the controller 140 waits for the predetermined time duration to elapse before continuing to Step 220. Preferably, the predetermined time duration is less than five seconds.

Next, the controller 140 checks whether the measured noise signal value falls within a first noise region in Step 240. If the measured noise signal value falls within a first noise region, the controller 140 sets the incoming call notification mode of the mobile communication terminal 100 to a vibration mode in Step 250.

More specifically, the noise signal value falls within the first noise region when it is less than a lower reference noise signal value or greater than an upper reference noise signal value. The lower reference noise signal value is preferably between 30 and 40 dB, which is a range typically measured in a library. The lower reference noise signal value may be preset during manufacture of the mobile communication terminal 100 or set based on the user's selection information. The upper reference noise signal value may be a bell sound signal value set by the user.

If the measured noise signal value does is not determined in Step 240 to fall within a first noise, the controller 140 sets the incoming call notification mode of the mobile communication terminal 100 to a bell mode in Step 260. More specifically, if the noise signal value does not fall within the first noise region, it falls within a second noise region different from the first noise region. The noise signal value falls within the second noise region when it is both greater than the lower reference noise signal value and less than the upper reference noise signal value.

While performing the mode setting, the controller 140 controls the communication unit 150 to check whether an incoming call signal has been input in Step 270. If an incoming call signal has been input, the controller 140 processes the incoming call in the set incoming call notification mode in Step 280. For example, if the incoming call notification mode is set to a vibration mode, the controller 140 controls the vibration generator 160 to output vibration. If the incoming call notification mode is set to a bell mode, the controller 140 controls the audio processor 120 to output a preset bell sound through the speaker SPK 121.

The mobile communication terminal 100 and the method of performing an automatic incoming call notification mode change according to the present embodiment allows an incoming call notification mode to be automatically changed depending on the level of an ambient noise signal, thereby eliminating the need for a user to manually change the incoming call notification mode depending on ambient conditions.

Figure 4:
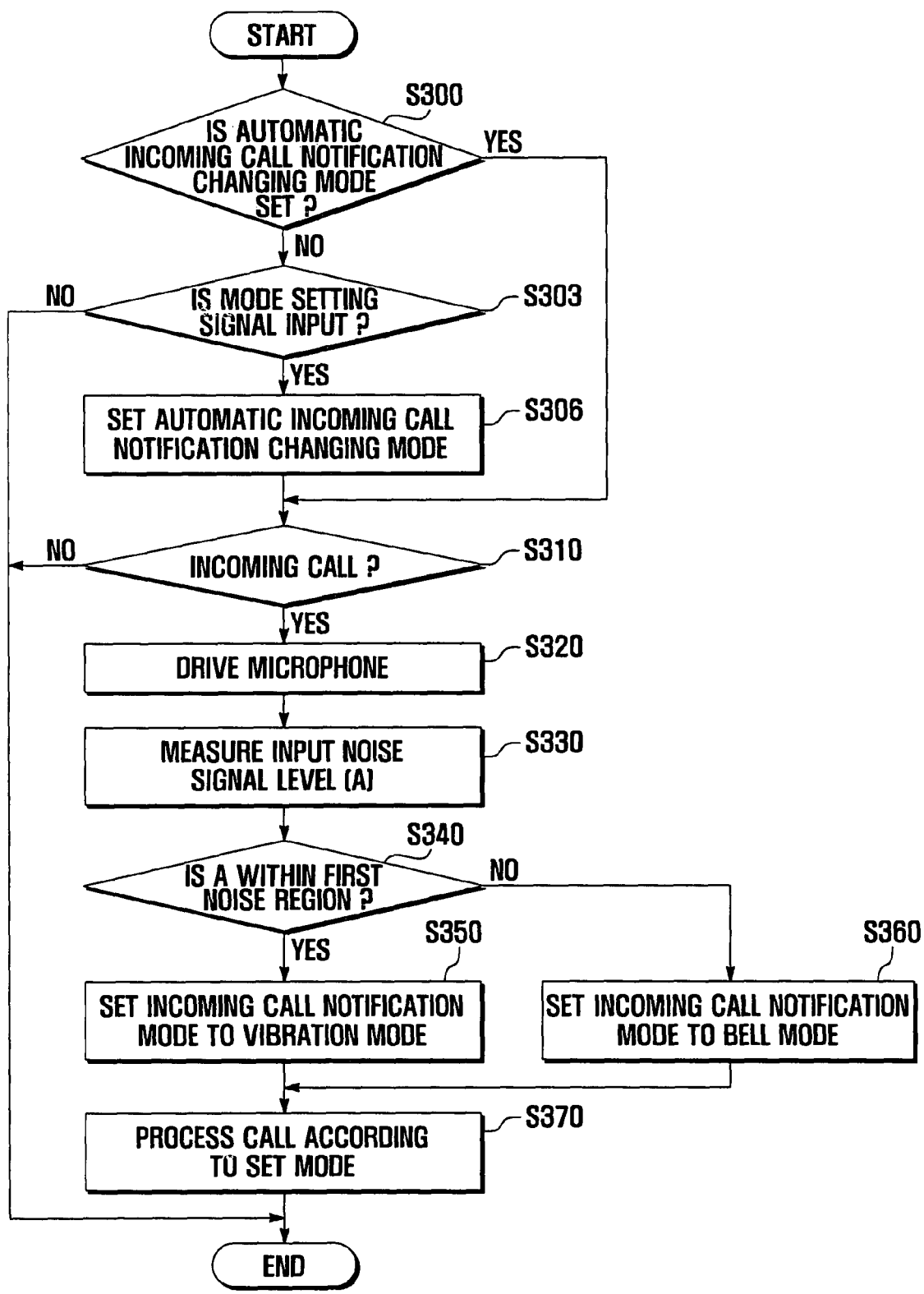
FIG. 4 is a flowchart illustrating a method of performing an automatic incoming call notification mode change according to another embodiment of the present invention.

FIG. 4 is a flowchart illustrating a method of performing an automatic incoming call notification mode change according to another embodiment of the present invention. Referring to FIGS. 1 and 4, the controller 140 checks whether an incoming call notification mode of the mobile communication terminal 100 is set to an automatic incoming call notification changing mode in Step 300. If an incoming call notification mode is not set to the automatic incoming call notification changing mode, the controller 140 checks whether a signal for setting an automatic incoming call notification changing mode has been input in Step 303. If such a signal has been input, the controller 140 sets the incoming call notification mode to an automatic incoming call notification changing mode in Step 306. If such a signal has not been input, the controller 140 performs an appropriate function. That is, the controller 140 performs an incoming call notification mode set by the user.

If the incoming call notification mode of the mobile communication terminal 100 is determined in Step 300 to be set to an automatic incoming call notification changing mode, the controller 140 controls the communication unit 150 to check whether an incoming call signal has been input in Step 310. If an incoming call signal has been input, the controller 140 controls the audio processor 120 to drive the microphone MIC 123 in Step 320, and measures the noise signal value input through the microphone MIC 123 in Step 330.

Next, the controller 140 checks whether the measured noise signal value falls within a first noise region in Step 340. If the measured noise signal value falls within a first noise region, the controller 140 sets the incoming call notification mode of the mobile communication terminal 100 to a vibration mode in Step 350.

If the measured noise signal value is determined in Step 340 not to fall within a first noise region, the controller 140 sets the incoming call notification mode to a bell mode in Step 360. The controller 140 then processes an incoming call in the bell mode in Step 370. That is, if the incoming call notification mode is set to a vibration mode, the controller controls the vibration generator 160 to vibrate the terminal 100. If the incoming call notification mode is set to a bell mode, the controller 140 controls the audio processor 120 to output a preset bell sound through the speaker SPK 121.

A mobile communication terminal and a method of performing an automatic incoming call notification mode change according to the present invention allow an incoming call notification mode to be automatically changed depending on the level of an ambient noise signal, thus eliminating the need for a user to manually change the incoming call notification mode depending on ambient conditions.

While the present invention has been particularly shown and described with reference to embodiments thereof, it will be understood by those of ordinary skill in the art that various changes and modifications in form and details may be made without departing from the spirit and scope of the present invention, as defined by the following claims.

What is claimed is:

1. A mobile communication terminal for setting a vibration mode, the mobile communication terminal comprising:
   a storage unit for storing a plurality of reference noise signal levels;
   an audio processor for measuring a noise signal value;
   a noise signal level comparator for comparing the measured noise signal value with at least one of the plurality of reference noise signal levels stored in the storage unit; and
   a controller for setting the vibration mode if the measured noise signal value is determined to fall within a first noise region according to a comparison by the noise signal level comparator,
   wherein the plurality of reference noise signals includes a lower reference noise signal value lower than an upper reference noise signal value, and
   wherein the first noise region comprises measured noise values less than the lower reference noise signal and measured noise values greater than the upper reference noise signal value.

2. The terminal of claim 1, wherein the controller drives the audio processor at time intervals of a predetermined duration.

3. The terminal of claim 2, wherein the predetermined duration is five seconds.

4. The terminal of claim 1, further comprising a communication unit for receiving an external incoming call signal, wherein, upon receipt of an incoming call from the communication unit, the controller drives the audio processor.

5. The terminal of claim 1, wherein the controller sets a bell mode if the measured noise signal value is determined to fall within a second noise region according to the comparison by the noise level comparator, wherein the second noise region comprises measured noise values greater than the lower reference noise signal value or less than the upper reference noise signal value.

6. The terminal of claim 1, further comprising a communication unit for receiving an external incoming call signal,
wherein the controller, upon reciept of an incoming call from the communication unit, processes the incoming call according to a set vibration mode.

7. The terminal of claim 1, wherein the lower reference noise signal value is between 30 and 40 decibels.

8. The terminal of claim 1, wherein the upper reference noise signal value is equal to a bell sound signal value that is preset by a user.

9. The terminal of claim 8, wherein the bell sound signal value includes at least two values.

10. A method of setting a vibration mode for a mobile communication terminal, the method comprising:
measuring a noise signal value;
comparing the measured noise signal value with at least one of a lower reference noise signal level and an upper reference noise signal level; and
setting the vibration mode if the measured noise signal value falls within a first noise region,
wherein the lower reference noise signal value is lower than the upper reference noise signal value, and
wherein the first noise region comprises measured noise values less than the lower reference noise signal value and measured noise values are greater than the upper reference noise signal value.

11. The method of claim 10, wherein, in the step of measuring a noise signal value, the microphone is driven at time intervals of a predetermined duration to measure the noise signal value.

12. The method of claim 11, wherein the predetermined duration is five seconds.

13. The method of claim 10, wherein, in the step of measuring a noise signal value, the microphone is driven to measure the noise signal value when an incoming call is received.

14. The method of claim 10, further comprising setting a bell mode if the measured noise signal value is determined to fall within a second noise region,
wherein the second noise region comprises measured noise values greater than the lower reference noise signal value and less than the upper reference noise signal value.

15. The method of claim 10, wherein the lower reference noise signal value is between 30 and 40 decibels.

16. The method of claim 10, wherein the upper reference noise signal value is equal to a bell sound signal value that is preset by a user.

17. The method of claim 16, wherein the bell sound signal value includes at least two values.

18. The method of claim 10, further comprising processing, upon reciept of an incoming call, the incoming call according to a set vibration mode.

* * * * *